United States Patent [19]

Cohen

[11] 4,185,047

[45] Jan. 22, 1980

[54] THERMOPLASTIC MOLDING COMPOSITIONS

[75] Inventor: Stuart C. Cohen, Evansville, Ind.

[73] Assignee: General Electric Company, Pittsfield, Mass.

[21] Appl. No.: 866,008

[22] Filed: Dec. 30, 1977

[51] Int. Cl.² .............................................. C08L 67/06
[52] U.S. Cl. .............................. 525/94; 260/45.7 PH; 260/45.85 B; 260/860; 525/99
[58] Field of Search ......................................... 260/873

[56] References Cited

U.S. PATENT DOCUMENTS

| | | | |
|---|---|---|---|
| 3,361,848 | 1/1968 | Siggel | 260/873 |
| 3,405,198 | 10/1968 | Rein | 260/873 |
| 3,435,093 | 3/1969 | Cope | 260/873 |
| 3,534,120 | 10/1970 | Ando | 260/873 |
| 3,562,200 | 2/1971 | Jones | 260/873 |
| 3,578,729 | 5/1971 | Brinkmann | 260/873 |
| 3,579,609 | 5/1971 | Sevenich | 260/873 |
| 3,580,965 | 5/1971 | Brinkmann | 260/873 |
| 3,585,255 | 6/1971 | Sevenich | 260/873 |
| 3,626,026 | 12/1971 | Fukumura | 260/873 |
| 3,642,945 | 2/1972 | Cleary | 260/873 |
| 3,937,757 | 2/1976 | Seydl | 260/873 |
| 3,944,699 | 3/1976 | Mathews | 260/873 |
| 3,963,801 | 6/1976 | Su | 260/873 |
| 4,010,222 | 3/1977 | Shih | 260/873 |
| 4,020,126 | 4/1977 | Gander | 260/873 |
| 4,046,837 | 9/1977 | Carroll | 260/873 |
| 4,122,061 | 10/1978 | Halub | 260/873 |

FOREIGN PATENT DOCUMENTS 2345459  3/1975  Fed. Rep. of Germany ........... 260/873

*Primary Examiner*—Paul Lieberman
*Attorney, Agent, or Firm*—Morgan, Finnegan, Pine, Foley & Lee

[57] ABSTRACT

A thermoplastic molding composition having improved mold release properties is provided, the composition comprising a thermoplastic resin selected from the group consisting of a high molecular weight linear polyester and a high molecular weight block copolyester, from about 0.1 to 4.5% by weight, based on the total composition, of a polyolefin or olefin-based copolymer, and, optionally, from about 0.02 to 0.5% by weight, based on the total composition, of talc.

18 Claims, No Drawings

THERMOPLASTIC MOLDING COMPOSITIONS

BACKGROUND OF THE INVENTION

This invention relates to improved thermoplastic molding compositions and, more particularly, to improved thermoplastic polyester and copolyester molding compositions.

High molecular weight linear polyesters and copolyesters of glycols and terephthalic or isophthalic acid have been available for a number of years. These are described inter alia in Whinfield et al, U.S. Pat. No. 2,465,319, and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection-moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

Recently, block copolyesters, wherein the major portion of the repeating units are poly(1,4-butylene terephthalate) blocks, have been found to have enhanced impact resistance.

It has now been discovered that if a small amount of a polyolefin or olefin-based copolymer is incorporated in the thermoplastic molding compositions, such as those described hereinbefore, the compositions exhibit vastly improved mold releasability.

DETAILED DESCRIPTION OF THE INVENTION

According to this invention then, there are provided thermoplastic compositions which are useful for molding or extrusion, e.g., injection molding, injection blow molding, compression molding, transfer molding, profile extrusion, sheet extrusion, wire coating, extrusion blow molding and the like, the compositions have improved mold release and other good physical properties after molding, such as good surface appearance, comprising (a) a thermoplastic resin selected from the group consisting of a linear high molecular weight polyester and a block copolyester derived from
  (i) a terminally-reactive poly(1,4-butylene terephthalate) and
  (ii) a terminally-reactive aromatic/aliphatic copolyester of a dicarboxylic acid selected from the group consisting of terephthalic acid, isophthalic acid, naphthalene dicarboxylic acids, phenyl indane dicarboxylic acid and compounds of the formula:

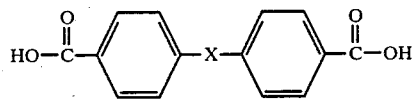

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid, or
  (iii) a terminally-reactive aliphatic polyester of a straight chain aliphatic dicarboxylic acid having from 4 to 12 carbon atoms in the chain and a straight or branched chain aliphatic glycol, said blocks being connected by inter terminal linkages consisting essentially of ester linkages;

(b) from about 0.1 to 4.5% by weight, based on the total composition, of a polyolefin or olefin-based copolymer; and (c) optionally, from about 0.02 to 0.5% by weight, based on the total composition, of talc.

The high molecular weight linear polyesters used in the practice of the present invention are polymeric glycol esters of terephthalic acid and isophthalic acids. They are available commercially or can be prepared by known techniques, such as by the alcoholysis of esters of the phthalic acid with a glycol and subsequent polymerization, by heating glycols with the free acids or with halide derivatives thereof, and similar processes. These are described in U.S. Pat. No. 2,465,319 and U.S. Pat. No. 3,047,539, and elsewhere.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula:

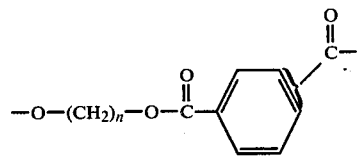

wherein n is a whole number of from two to four, and mixtures of such esters, including copolyesters of terephthalic and isophthalic acids of up to about 30 mole percent isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters/gram and, preferably, at least 0.7 deciliters/gram as measured in a 60:40 phenol-tetrachloroethane mixture at 30° C. At intrinsic viscosities of at least about 1.1 deciliters/gram, there is a further enhancement in toughness of the present compositions.

The block copolyesters useful in the composition of this invention are prepared by the reaction of terminally-reactive poly(butylene terephthalate), preferably, low molecular weight, and a terminally-reactive copolyester or polyester in the presence of a catalyst for transeterification, such as zinc acetate, manganese acetate, titanium esters, and the like. The terminal groups can comprise hydroxyl, carboxyl, carboalkoxy, and the like, including reactive derivatives thereof. The result of reaction between two terminally reactive groups, of course, must be an ester linkage. After initial mixing, polymerization is carried out under standard conditions, e.g., 220 to 280° C., in a high vacuum, e.g., 0.1 to 2 mm Hg, to form the block copolymer of minimum randomization in terms of distribution of chain segments. These copolyesters are described in copending U.S. application Ser. No. 752,325, filed on Dec. 20, 1976, incorporated herein by reference.

The copolyester designated component (ii), hereinabove, is preferably prepared from terephthalic acid or isophthalic acid or a reactive derivative thereof and a glycol, which may be a straight or branched chain aliphatic glycol. Illustratively, the glycol will be 1,4-butanediol; 1,5-pentanediol; 1,6-hexanediol; 1,9-nonanediol; 1,10-decanediol; neopentyl glycol; 1,4-cyclohexanediol; 1,4-cyclohexane dimethanol, a mixture of any of the foregoing, or the like. Illustrative of suitable aliphatic dicarboxylic acids for the mixed aromatic/aliphatic embodiments are suberic, sebacic, azelaic, adipic acids and the like.

The copolyesters may be prepared by ester interchange in accordance with standard procedures. The copolyesters designated (ii) are most preferably derived from an aliphatic glycol and a mixture of aromatic and aliphatic dibasic acids in which the mole ratio concentration of aromatic to aliphatic acids is from between 1 to 9 to 1, with an especially preferred range being from about 3 to 7 to about 7 to 3.

The terminally reactive aliphatic polyesters designated component (iii) will contain substantially stoichiometric amounts of the aliphatic diol and the aliphatic dicarboxylic acid, although hydroxy-containing terminal groups are preferred.

In addition to their ease of formation by well-known procedures, both the aromatic/aliphatic copolyesters (ii) and the aliphatic polyesters (iii) are commercially available. One source for such materials is the Ruco Division/Hooker Chemical Company, Hicksville, N.Y., which designates its compounds as "Rucoflex."

The block copolyesters used in the invention preferably comprise from 95 to 50 parts by weight of the segments of poly(1,4-butylene terephthalate). The poly(1,4-butylene terephthalate) blocks, before incorporation into the block copolyesters, will preferably have an intrinsic viscosity of above 0.1 dl./g. and preferably, between 0.1 and 0.5 dl./g., as measured in a 60:40 mixture of phenol/tetrachloroethane at 30° C. The balance, 5 to 50 parts by weight of the copolyester will comprise blocks of components (ii) or (iii).

As will be understood by those skilled in the art, the poly(1,4-butylene terephthalate) block can be straight chain or branched, e.g., by use of a branching component, e.g., 0.05 to 1 mole %, based on terephthalate units, of a branching component which contains at least three ester-forming groups. This can be a glycol, e.g., pentaerythritol, trimethylolpropane, and the like, or a polybasic acid compound, e.g., trimethyl trimestate, and the like.

The polyolefin or olefin-based copolymer additives of the present invention are, preferably, selected from polyethylene, including high and low density polyethylene, propylene-ethylene copolymer, ethylene-vinyl acetate copolymer, ethylene-acrylic acid copolymer, and the like. Polyethylene is most preferred. These polymers are well known to those skilled in the art and for the most part are commercially available. In general, the polyolefin or olefin-based copolymer additive is employed in amounts ranging from about 0.1% by weight to 4.5% by weight of the total weight of the composition. Preferably, from about 0.5 to about 2% by weight, of the total composition, is employed. By virtue of the presence of the polyolefin or olefin-based copolymer additive, the compositions of the present invention exhibit significant improvement in mold releasability.

Small amounts, such as from about 0.02 to about 0.5% by weight, based on the total composition, of talc may be included in the composition of this invention. Compositions of polyester, polyolefin and talc exhibit good mold releasability and good surface appearance.

The compositions of the present invention are prepared in conventional ways. For example, in one way, the polyolefin or olefin-based copolymer, and talc, if used, are all put into an extrusion compounder with the thermoplastic resin to produce molding pellets. The polyolefin or olefin-based copolymer, and talc, are dispersed in a matrix of the thermoplastic in the process. In another procedure, the polyolefin or olefin-based copolymer, are mixed with the thermoplastic resin by dry blending, then either fluxed on a mill and comminuted, or they are extruded and chopped. The polyolefin or olefin-based copolymer and talc, if used, can also be mixed with the powdered or granular thermoplastic resin and directly molded, e.g., by injection or transfer molding techniques. It is always important to thoroughly free the thermoplastic resin from as much water as possible.

In addition, compounding should be carried out to ensure that the residence time in the machine is short; the temperature is carefully controlled, the friction heat is utilized, and an intimate blend between the polyolefin or olefin-based copolymer and the thermoplastic resin is obtained.

Although it is not essential, best results are obtained if the ingredients are pre-compounded, pelletized, and then molded. Pre-compounding can be carried out in conventional equipment. For example, after carefully pre-drying the thermoplastic resin, e.g., at 125° C. for 4 hours, a single screw extruder is fed with a dry blend of the polyester and the polyolefin or olefin-based copolymer, the screw employed having a long transition and metering section to ensure melting. On the other hand, a twin screw extrusion machine, e.g., a 28 mm Werner Pfleiderer machine can be fed with resin and additives at the feed port. In either case, a generally suitable machine temperature will be about 450° to 570° F.

The pre-compounded composition can be extruded and cut up into molding compounds such as conventional granules, etc., by standard techniques.

The compositions of this invention can be molded in any equipment conventionally used for thermoplastic compositions. For example, with poly(1,4-butylene-terephthalate), good results will be obtained in an injection molding machine, e.g., of the Newbury type with conventional cylinder temperature, e.g., 450° F. and conventional mold temperatures, e.g., 150° F. On the other hand, with poly(ethylene terephthalate), because of the lack of uniformity of crystallinization from interior to exterior of thick pieces, somewhat less conventional but still well-known techniques can be used. For example, a nucleating agent such as graphite or a metal oxide, e.g., ZnO or MgO can be included and standard mold temperature of at least 230° F. will be used.

In order that those skilled in the art may better understand how to practice the present invention, the following examples are given by way of illustration and not by way of limitation.

EXAMPLES 1–6

The following formulations are mechanically blended, then extended and molded into test pieces in a Van Dorn injection molding machine.

Table 1

| Example | 1 | 2 | 3 | 4 | 5 | 6 | 7 |
|---|---|---|---|---|---|---|---|
| Ingredients (parts by weight) | | | | | | | |
| VALOX 310[a] | 98.5 | 98.3 | 98.9 | 98.7 | 99 | 97.5 | 97.5 |
| Microthene[b] FN 510 | 1.5 | 1.5 | 1.0 | 1.0 | | | |
| Dow 435[c] | | | | | | 1.0 | 2.5 |
| Irganox 1093[d] | | 0.15 | | 0.15 | | | |
| Ferro 904[e] | | 0.05 | | 0.05 | | | |
| Talc | | | 0.1 | 0.1 | | | |
| Alathon 3892[f] | | | | | | | 2.5 |

Each of the above formulations exhibits improved mold releasability compared to 100% poly(1,4-butylene terephthalate) and has the following physical properties

| Properties | — | | | | | | |
|---|---|---|---|---|---|---|---|
| Notched Izod inpact strength ft. lbs./in. | — | — | 1.0 | — | 1.05 | 1.05 | |
| Unnotched Izod impact strength ft. lbs./in. | — | 48.8 | — | — | — | — | — |
| Tensile strength psi | — | 7540 | 7500 | 7400 | 7500 | 7400 | 7150 |
| Elongation % | — | 353 | 301 | 269 | 252 | 254 | 257 |
| Flex strength, psi | — | 13,000 | — | — | — | — | |
| Flex modulus, psi | — | 334,000 | — | — | — | — | |

[a]poly(1,4-butylene terephthalate), about 0.9 intrinsic viscosity measured in a solution of phenol and tetrachloroethane (60:40) at 30° C.) available from G.E.
[b]polyethylene having average particle size of less than 20 microns sold by U.S.I. Chemicals, N.Y., N.Y.
[c]ethylene-acrylic acid copolymer, 3.5% acrylic acid (Dow Chemical U.S.A.)
[d]tetrakis (3,5-di-t-butyl-4-hydroxy phenyl propionyl oxy methyl) methane
[e]diphenyl decylphosphite
[f]copolymer of ethylene and vinyl acetate, 25% vinyl acetate (U.S.I. Chemicals)

EXAMPLES 7–9

The following formulations are mechanically blended, then extended and molded into test pieces in a Van Dorn injection molding machine.

Table 2

| Example | 7 | 8 | 9 |
|---|---|---|---|
| Ingredients (parts by weight) | | | |
| VALOX 330[g] | 98.8 | 99.0 | 98.9 |
| Microthene FN 510 | 1.0 | 1.0 | 1.0 |
| Ferro 904 | 0.05 | | |
| Irganox 1093 | 0.15 | | |
| talc | | | 0.1 |

Each of the above formulations ehibits improved mold releasability compared to 100% block copolyester and has the following physical properties

| Example | 7 | 8 | 9 |
|---|---|---|---|
| Properties | | | |
| Notched Izod impact strength ft. lbs./in. notch | 1.71 | 1.94 | 1.35 |
| unnotched Izod impact strength ft. lbs./in. | 36.8 | 36.3 | |
| tensile strength, psi | 4960 | 4864 | 5200 |

Table 2-continued

| elongation % | 292.9 | 328.9 | 412 |
|---|---|---|---|

[g]block copolyester of poly(1,4-butylene terephthalate) and poly (1,6-hexylene-(0.7) azelate-(0.3) isophthalate)

The following formulations are mechanically blended, then extended and molded into test pieces in a Van Dorn injection molding machine.

Table 3

| Example | 10 | 11 | 12 |
|---|---|---|---|
| Ingredients (parts by weight) | | | |
| VALOX 315[h] | 98.9 | 98.9 | 98.9 |
| Microthene FN 510 | 1 | | |
| talc | 0.1 | 0.1 | 0.1 |
| Epolene N-10[i] | | 1.0 | |
| Dow 459[j] | | | 1.0 |

Each of the above formulations exhibits improved mold releasability compared to 100% poly (1,4-butylene terephthalate) and Example 10 exhibits exceptionally good surface appearance. The following additional physical properties are also exhibited:

| Example | 10 | 11 | 12 |
|---|---|---|---|
| Properties | | | |
| Notched Izod impact strength ft. lbs./in. | 1.05 | 0.9 | 1.1 |
| Flex strength, psi | 13,200 | 13,100 | 13,000 |
| Flex modulus, psi | 350,000 | 361,000 | 354,000 |
| Tensile strength, psi | 7,300 | 7,600 | 7,550 |
| elongation % | 285 | 294 | 303 |

[h]poly (1,4-butylene terephthalate) intrinsic viscosity 1.1 in., a solution of phenol and tetrachloroethane (60:40) at 30° C.
[i]low molecular weight polyethylene resin
[j]ethylene-acrylic acid copolymer, 8% acrylic acid Obviously, other modifications and variations of the present invention are possible in light of the above teachings. It is, therefore, to be understood that changes may be made in the particular embodiments of the invention described which are within the full intended scope of the invention as defined by the appended claims.

I claim:

1. An improved molding composition, having improved mold releasability, said composition comprising:
(a) a block copolymer derived from blocks of
 (i) a terminally reactive poly(1,4-butylene terephthalate) and
 (ii) a terminally reactive aromatic/aliphatic copolyester of a dicarboxylic acid selected from the group consisting of terephthalic acid, isophthalic acid, naphthalene dicarboxylic acids, phenyl indane dicarboxylic acid and compounds of the formula

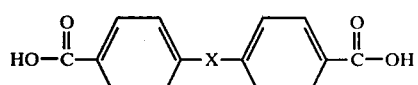

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid; or
  (iii) a terminally-reactive aliphatic polyester of a straight chain aliphatic dicarboxylic acid having from 4 to 12 carbon atoms in the chain and a straight or branched chain aliphatic glycol, said blocks being connected by interterminal linkages consisting essentially of ester linkages;
(b) from about 0.25 to 4.5 percent by weight, based on the total composition, of a composition, of a polyolefin or olefin-based copolymer; and
(c) from about 0.02 to about 0.5% by weight, based on the total composition, of talc.

2. A composition as defined in claim 1 wherein said polyolefin or olefin-based copolymer is selected from the group consisting of polyethylene, ethylene-acrylic acid copolymer and ethylene-vinyl acetate copolymer.

3. A composition as defined in claim 1 wherein said polyolefin is polyethylene.

4. A composition as defined in claim 1 wherein said thermoplastic resin is a block copolyester derived from blocks of
  (i) a terminally-reactive poly(1,4-butylene terephthalate) and
  (ii) a copolyester of isophthalic acid and a straight chain aliphatic dicarboxylic acid having from 6 to 12 carbon atoms in the chain with one or more straight or branched chain dihydric aliphatic glycols having from 4 to 10 carbon atoms in the chain.

5. A composition as defined in claim 4, wherein said block copolyester is derived from blocks of
  (i) a terminally-reactive poly(1,4-butylene terephthalate) and
  (ii) a polyester of a straight chain aliphatic dicarboxylic acid having from 6 to 12 carbon atoms and a branched chain dihydric aliphatic glycol.

6. A composition as defined in claim 4 wherein said block copolyester is derived from blocks of
  (i) terminally-reactive poly (1,4-butylene terephthalate) and
  (ii) poly(1,6-hexylene-azelate-co-isophthalate).

7. A composition as defined in claim 4 wherein said block copolyester is derived from blocks of
  (i) terminally-reactive poly(1,4-butylene terephthalate) and
  (ii) poly(1,6-hexylene-(0.7)-azelate-co-(0.3) isophthalate.

8. A composition as defined in claim 4 wherein said block copolyester is derived from blocks of
  (i) terminally-reactive poly(1,4-butylene terephthalate) and
  (ii) poly(1,6-hexylene-adipate-co-isophthalate).

9. A composition as defined in claim 4 wherein said block copolyester is derived from blocks of
  (i) terminally-reactive poly(1,4-butylene terephthalate) and
  (ii) poly(1,6-hexylene-(0.5)-adipate-co-(0.5) isophthalate).

10. A composition as defined in claim 4 wherein said block copolyester is derived from blocks of
  (i) terminally-reactive poly(1,4-butylene terephthalate) and
  (ii) poly(1,6-hexylene-(0.7)-adipate-co-(0.3)-isophthalate).

11. A composition as defined in claim 4 wherein said block copolyester is derived from blocks of
  (i) terminally-reactive poly(1,4-butylene terephthalate) and
  (ii) poly(1,6-hexylene-co-neopentyl-adipate-co-isophthalate).

12. A composition as defined in claim 4 wherein said block copolyester is derived from blocks of
  (i) terminally-reactive poly(1,4-butylene terephthalate) and
  (ii) poly(neopentyl-adipate).

13. A composition as defined in claim 4 wherein said block copolymer is derived from blocks of
  (i) terminally-reactive poly(1,4-butylene terephthalate) and
  (ii) poly(1,4-butylene-adipate).

14. A composition as defined in claim 4 wherein said block copolyester is derived from blocks of
  (i) terminally-reactive poly(1,4-butylene terephthalate) and
  (ii) poly(ethylene-co-1,4-butylene-adipate).

15. An improved flame-retardant thermoplastic molding composition, said composition comprising:
(a) a block copolyester derived from blocks of
  (i) terminally-reactive poly(1,4-butylene terephthalate) and
  (ii) poly(1,6-hexylene-azelate-co-isophthalate); and
(b) from about 0.1 to 4.5 percent by weight, based on the total composition, of a polyolefin or olefin-based copolymer.

16. A composition as defined in claim 15 wherein said polyolefin or olefin-based copolymer is selected from the group consisting of polyethylene, ethylene-acrylic acid copolymer, and ethylene-vinyl acetate copolymer.

17. A composition as defined in claim 15 wherein said polyolefin is polyethylene.

18. A composition as defined in claim 15 wherein said polyolefin is low density polyethylene and said poly(1,6-hexylene-azelate-co-isophthalate is poly(1,6-hexylene-(0.7)-azelate-co-(0.3) isophthalate.

* * * * *

UNITED STATES PATENT AND TRADEMARK OFFICE
CERTIFICATE OF CORRECTION

PATENT NO. : 4,185,047

DATED : January 22, 1980

INVENTOR(S) : Stuart C. Cohen

It is certified that error appears in the above-identified patent and that said Letters Patent are hereby corrected as shown below:

Col. 3, line 31, insert between "9" and "to" the words -- and 9 --.

Signed and Sealed this

Ninth Day of December 1980

[SEAL]

Attest:

SIDNEY A. DIAMOND

Attesting Officer

Commissioner of Patents and Trademarks